UNITED STATES PATENT OFFICE.

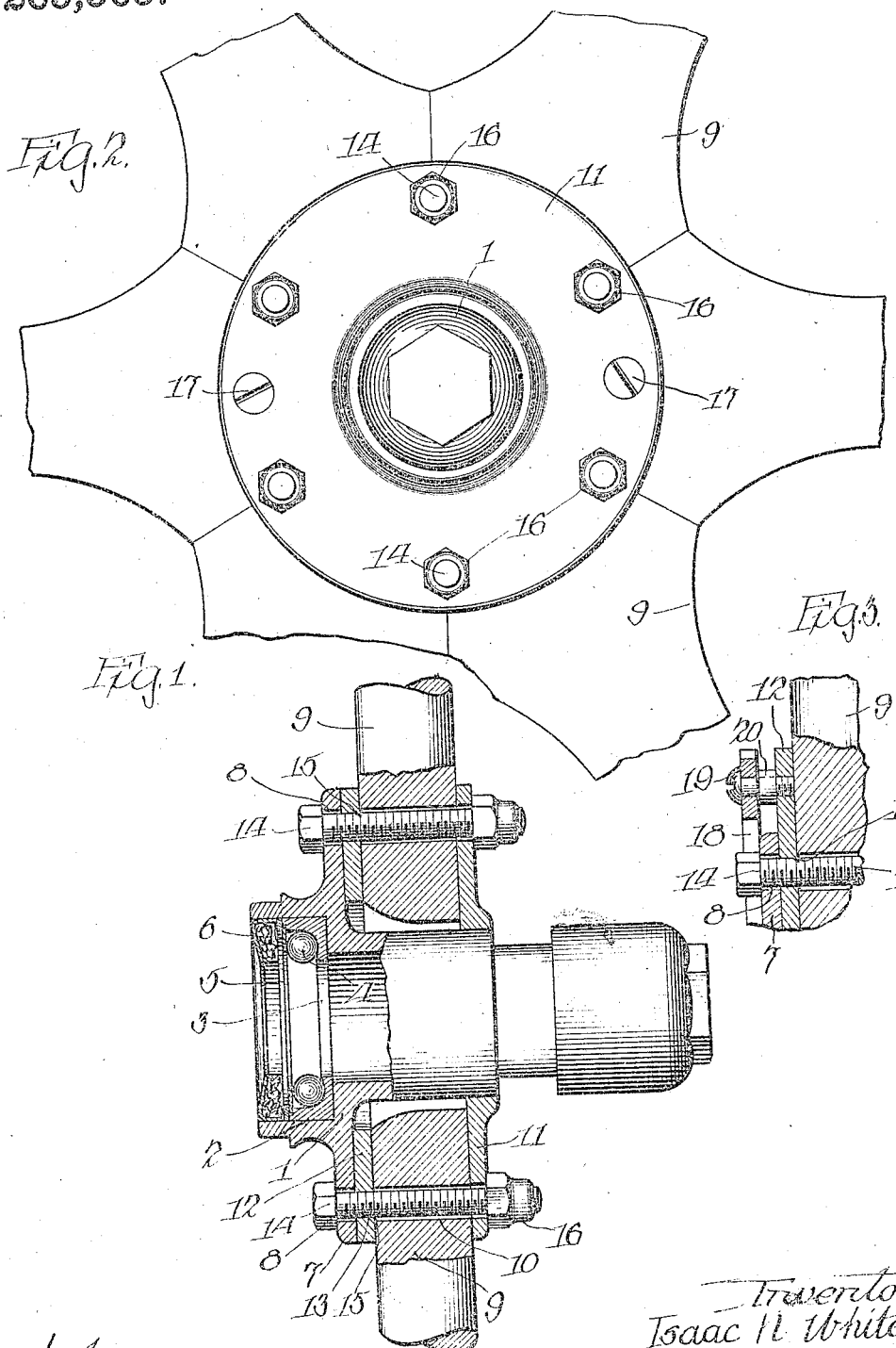

ISAAC N. WHITE, OF CHICAGO, ILLINOIS.

DEMOUNTABLE WHEEL.

1,265,565.

Specification of Letters Patent.  Patented May 7, 1918.

Application filed March 28, 1917. Serial No. 157,868.

*To all whom it may concern:*

Be it known that I, ISAAC N. WHITE, a citizen of the United States, residing at Chicago, in the county of Cook and State of Illinois, have invented certain new and useful Improvements in Demountable Wheels, of which the following is a specification.

This invention relates to a vehicle wheel which is demountable from its hub to permit the interchange of wheels, such, for example, as the wheels of an automobile, making it possible to substitute an extra wheel on which is an inflated tire for one which has failed in use, by simply removing the wheel from the hub and placing the extra wheel thereon. The invention consists in the novel construction, combination and arrangement of the parts.

In the accompanying drawing, Figure 1 is a sectional view of a portion of a wheel and of the hub thereof, embodying this invention; Fig. 2 is a side elevation of the parts shown in Fig. 1; and Fig. 3 shows an extended fastening ring for a speedometer gear attachment.

The construction shown and described is that commonly employed in the Ford automobile, although, of course, it may have a general application to other wheels of this class.

A wheel hub member 1 is formed with a central perforation into which an axle (not shown) for the wheel is inserted, and comprises a recess 2 for a bearing ring 3 in which are bearings 4, held in place by a ring 5 and protected by a washer 6. Extending from the body of the member 1, is a flange 7 which is ordinarily formed with unthreaded perforations 8 through which fastening members are inserted to hold a wheel proper in position. The wheel comprises spokes 9 which are connected together around the center with a central perforation of sufficient size so that the connected portion of the spokes with the central perforation, may be passed over the hub member 1 and pressed against the flange 7. The connected spokes are formed with perforations 10 registering with the perforations 8 of the flange 7, so that the fastening members ordinarily employed are insertible through the holes in the flange 7 and through the holes 10 of the wheel. At the outer side is a perforated plate 11, and the fastening members ordinarily employed are inserted first through this plate 11, then through the perforations in the wheel, and through the perforations of the flanged plate 7 with fastening nuts applied on the inside.

Instead of inserting the fastening devices from the outside of the wheel, a metal ring 12 is provided in which are threaded perforations 13 registering with the perforations 8 of the flange. This ring has such an internal diameter that it may be placed tightly against the flange 7 and fastening bolts 14 are then inserted through the perforations 8 and the heads are threaded up tightly against the flange, drawing the ring 12 tightly against the flange on the other side thereof, in which position it is held by making an indentation 15 with a prick punch at the inside of the ring 12 to prevent the bolt 14 turning therein, or in any other suitable manner. This construction holds the fastening bolts 14 rigidly in place with respect to the hub member 1, even though the wheel be entirely removed, and there is no danger of any one or more of the bolts being displaced or getting lost in changing the wheels. The outer ends of the bolts 14 are provided with nuts 16 which are threaded in place against the plate 11 at the outer side of the wheel, thereby holding the wheel rigidly in place between the two metal plates. The outer plate 11 may be secured to the wheel by fastening screws 17.

The bolts 14 are uniformly threaded almost their entire length, so that the ring 12 may be drawn up tightly against the flange 7. If a threaded enlarged portion were provided near the headed end for attachment to the ring 12, and the outer end of the bolt were threaded for the nut 16, the same result would be obtained but it would be a more expensive construction.

A speedometer gear 18 is usually applied to one of the front wheels, and for this wheel a ring 12 is provided similar to the ring 12, which extends beyond the edge of the flange 7, into which portion a fastening screw 19 is threaded, the screw also extending through the gear 18 and through a spacing washer 20 for holding the gear 18 in the proper place.

In order to change a wheel, it is only necessary to remove the nuts 16 and pull the wheel from the hub, the bolts 14 being held in place by the ring 12; then substitute the extra wheel and replace the nuts.

I claim:

1. In a demountable wheel, a wheel hub member having an extending flange with unthreaded perforations, a metal ring having threaded perforations registering with the said other perforations, bolts inserted through the registering perforations for drawing the ring tightly against the flange, and means for preventing the removal of the bolts.

2. In a demountable wheel, the combination with a hub member having a perforated flange, of a ring having threaded perforations, bolts inserted through the perforations of the flange and ring for holding the bolts in place and the ring against the flange, a wheel telescoped over the hub member having perforations adjacent the center through which the bolts are inserted, and removable fastening means at the outer ends of the bolts to hold the wheel in place against the ring.

3. In a demountable wheel, the combination with a hub member having a perforated flange, of a ring having threaded perforations, bolts inserted through the perforations of the flange and ring for holding the bolts in place and the ring against the flange, a wheel telescoped over the hub member having perforations adjacent the center through which the bolts are inserted, and removable fastening means at the outer ends of the bolts to hold the wheel in place against the ring, said means comprising a perforated metal plate and nuts at the ends of the bolts to engage against the plate to clamp the wheel between it and the said ring.

4. The combination with a flanged wheel hub having unthreaded perforations in the flange, of a ring with threaded perforations corresponding to those of the flange, bolts inserted through the holes of the flange and threaded into the holes of the ring to draw it tightly against the flange thereby holding the bolts in place, a wheel telescoped over the hub having perforations to fit over the bolts, a plate secured to the outer side of the wheel having a perforation to fit over the hub and other perforations through which the bolts also extend, and fastening nuts attached to the ends of the bolts and against the said plate of the wheel for holding the wheel in place.

5. In a demountable wheel, the combination with a hub having a perforated flange, of a ring having corresponding threaded perforations, bolts extended through the perforations of the said ring, means for holding the bolts in place in the ring, a wheel secured to the bolts, and a speedometer gear attached to the said ring beyond the outer edge of the flange.

In testimony whereof I have signed my name to this specification on this 17th day of March, A. D. 1917.

ISAAC N. WHITE.